Sept. 3, 1946.  A. C. MOHR  2,406,890
PRODUCTION OF SULPHUR DIOXIDE
Filed Feb. 1, 1943
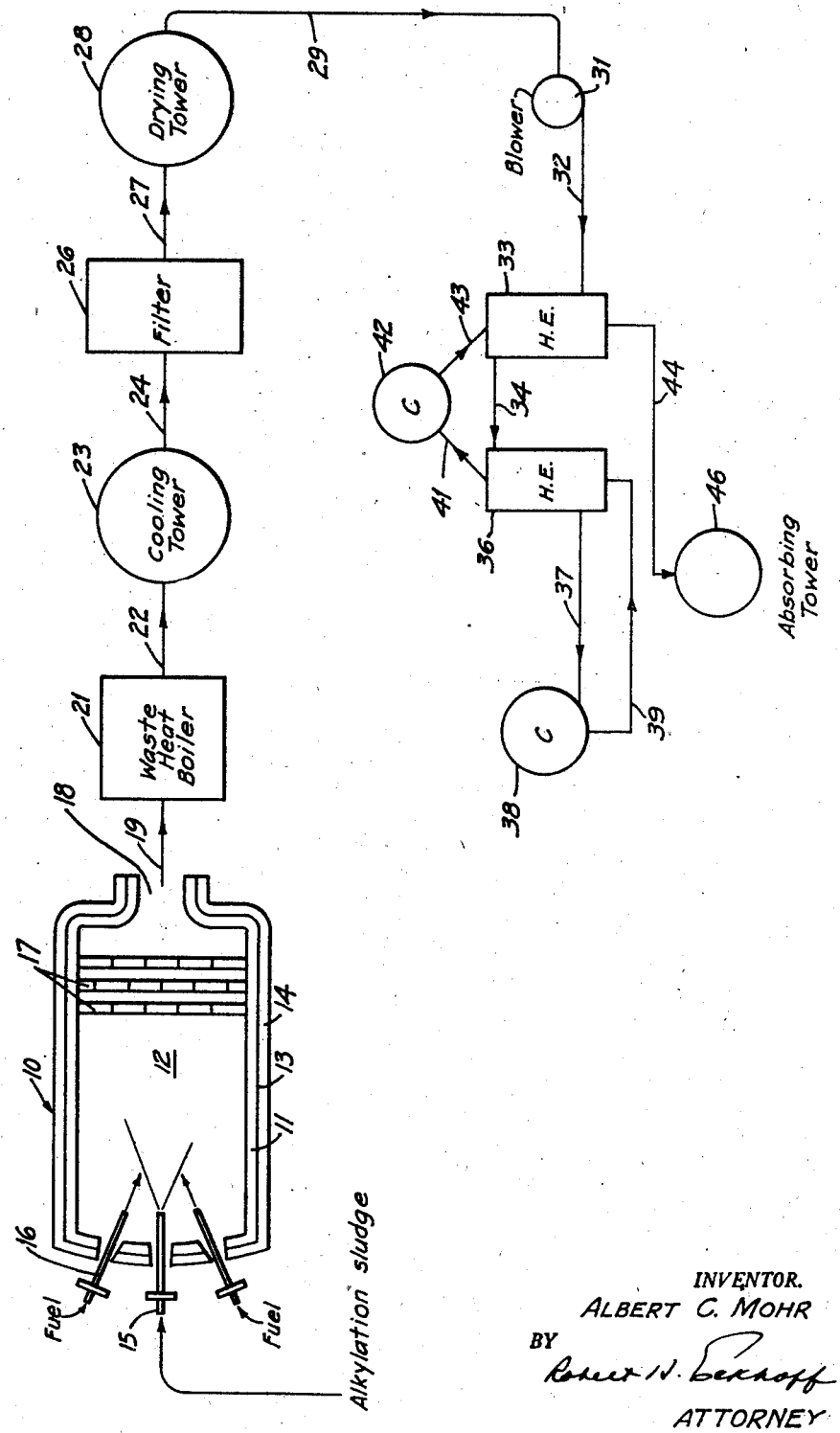
INVENTOR.
ALBERT C. MOHR
BY
ATTORNEY Patented Sept. 3, 1946

2,406,890

UNITED STATES PATENT OFFICE 2,406,890

PRODUCTION OF SULPHUR DIOXIDE

Albert C. Mohr, Arcadia, Calif., assignor, by mesne assignments, to Chemical Construction Corporation, New York, N. Y., a corporation of Delaware Application February 1, 1943, Serial No. 474,343

6 Claims. (Cl. 23—177)

This invention relates to the recovery of the sulphur values present in the sludge or sulphuric acid residue resulting from the condensation of olefins with paraffins in the presence of sulphuric acid. This condensation is usually termed alkylation and the sulphuric acid body removed is usually termed alkylation sludge. It will be so referred to here.

A typical alkylation sludge contains a relatively high percentage of sulphuric acid, usually between 83% and 90%. The total carbon content of the sludge is between 5% and 8% with about 1% of free oil and 4% to 8% unsaturated hydrocarbons. This sludge is quite different from the usual sludge recovered from refining of petroleum wherein the relative amounts of sulphuric acid bodies and carbon bodies are quite different, there being usually considerably more carbon present so that the sludge can be readily worked up at comparatively low temperatures to give a coke residue, free of acid and having a comparatively high content of volatile hydrocarbons. A typical process for recovery of the acid and fuel values from a petroleum refinery sludge is described in the Hechenbleikner Patents 1,953,225 and 1,953,226. In the former patent, for example, the acid sludge is heated in a rotary kiln by direct contact with hot combustion gases. In effect, the sulphur dioxide present is distilled out of the material at a low temperature to leave a dry coke containing so high a content of volatile hydrocarbons that the coke is useful as a fuel.

Because the gases issuing from the Hechenbleikner rotary kiln contain water and various condensable hydrocarbons in addition to sulphur dioxide, it has been proposed to pass this material through a secondary hydrocarbon combustion furnace as a means of removing the hydrocarbons present so that they would be removed instead of burning subsequently in the converters employed to catalyze the reaction of sulphur dioxide and oxygen to form sulphur trioxide. Thus, Clarke states in Patent 2,019,893 that while Hechenbleikner suggested these hydrocarbons be removed by refrigeration, unless this was practiced with extraordinary care and with elaborate equipment, complete removal could not be secured. As a consequence, water would form in the converters and would make difficult the subsequent condensation of the sulphur trioxide. Clarke proposed limited burning of the hydrocarbons in the gases removed from the rotary kilns so that, upon the subsequent addition of the necessary quantity of air required for conversion of the sulphur dioxide to sulphur trioxide, only a limited quantity of water would form in the converter.

I have found that none of these proposals for handling refinery sludge is adaptable to alkylation sludge because of the differences which exist between this sludge and the usual refinery sludges dealt with by Hechenbleikner, Clarke and others. To state my empirical findings shortly and concisely, it is necessary to vaporize or atomize the alkylation sludge and, while it is in this condition, subject it to such a high temperature that any water present is evaporated and all hydrocarbonaceous material present is burned to carbon dioxide and water. To accomplish this, it is necessary to burn additional fuel with the alkylation sludge and this under conditions that insure complete burning of the alkylation sludge. I have successfully operated by introducing air into the unit employed for heating and burning the alkylation sludge in an amount sufficient to insure the presence in the gas remaining after combustion of oxygen in excess of that quantity of oxygen required to convert the $SO_2$ to $SO_3$.

One of the principal objects of the present invention, therefore, is to provide a process for the recovery of the sulphur values in alkylation sludge as sulphur dioxide.

Another object of the invention, and no less important, is to provide a process enabling recovery of the sulphur values in alkylation sludge to be achieved as sulphuric acid.

The invention includes other objects and features of advantage, some of which, together with the foregoing will appear hereinafter. The single figure in the drawing accompanying and forming a part of the following description is a combination diagram of the combustion chamber and a flow sheet of the process employed for recovery of the sulphur dioxide values as sulphuric acid.

Referring to the drawing, the numeral 10 designates a burner comprising a shell 11 constructed of suitable refractory material, such as firebrick, and defining a combustion chamber 12 of preferably cylindrical cross section. Surrounding shell 11 is a steel casing 13 acting as a protective reinforcement. The outside of the steel shell is preferably covered with suitable heat insulating material 14.

At one end of the reaction chamber 12 and preferably centrally thereof is provided an alkylation sludge atomizing and injecting device 15 for discharging a mixture of atomized sludge and air into the reaction chamber 12. Placed about the alkylation sludge atomizing device 15 are a plurality of fuel burning devices 16. These are placed as a ring about the alkylation sludge atomizing device 15 so that the flame path from each burner 16 is directed into the stream issuing from the alkylation sludge atomizing device.

At the other end of the combination chamber 12 several tiers of checkerwork, usually made of refractory brick, are provided. These serve several purposes. First, they act as a means for radiating heat back into the combustion chamber to insure that the temperature therein is maintained sufficiently high so that the atomized sludge is subject to an adequately high temperature and is quickly brought up to that point whereat hydrocarbonaceous materials present are transformed to carbon dioxide and water. Second, the checkerwork brick serve as a support for suitable catalytic material for furthering the combustion of carbon and hydrogen in the fuel and in the sludge before the gases pass out through outlet 18.

In practice, the combustion chamber 12 is preferably made cylindrical in shape and comparatively of large capacity so that gases have adequate residence time in the combustion chamber. In one successful plant I employed a combustion chamber 12 feet in diameter and 25 feet in overall length. This handled 8,000 pounds of alkylation sludge per hour. The furnace volume should be comparatively large for the weight of the sludge handled to insure ample residence time. In the specific example the furnace volume is 35 cubic feet per hundred pounds of sludge per hour. This can be lowered to 15 cubic feet or increased, although if this is done the chamber size becomes uneconomical, and 50 cubic feet is usually a maximum.

The fuel and alkylation sludge supplied are mixed with sufficient air to insure that all carbon, hydrogen and sulphur in the gases issuing through the exit 18 are respectively converted to carbon dioxide, water and sulphur dioxide. To secure this, the necessary quantities of excess air are added, taking into account the composition of the fuel burned and the alkylation sludge. Usually the quantity of air introduced is such that oxygen need not be supplied upon the conversion of the sulphur dioxide to sulphur trioxide.

As a suitable fuel I have successfully employed refinery waste gases although one can use oil, natural gas, sulphur or hydrogen sulphide. Usually, however, sulphur will not have sufficiently high heat imparting capacity to suffice alone and, while it can be used as supplementary fuel and to provide a gas rich in sulphur dioxide, usually some quantity of oil or other fuel will have to be burned. Hydrogen sulphide alone will supply sufficient heat, usually one part by weight of hydrogen sulphide to two parts of alkylation sludge.

Before the gases are passed to the sulphuric acid plant, I remove substantially all water. This is accomplished by passing the gases, preferably through a waste heat boiler, pipe 19 leading from exit 18 passing to waste heat boiler 21. Here the gases are cooled down to a considerable extent, depending upon the heat economy desired. The partially cooled gases then pass through pipe 22 to a cooling tower 23 where the gases are further lowered in temperature, preferably by bringing them into direct contact with a cold water spray. If one cooling tower does not suffice, another or additional cooling means may be provided. In any case, the gases are lowered to a temperature whereat most of the water present is removed. The gases then pass on through pipe 24 to a filter 26 wherein mechanically entrained solid material and suspended droplets of sulphuric acid are removed. The filtered gas is then passed through pipe 27 into a drying tower 28 where the gases are brought into contact with high strength sulphuric acid to reduce the water content to that quantity essential for good operation of the sulphur dioxide conversion unit. The gases are withdrawn through pipe 29 by blower 31 and are forced on through a pipe 32 into a first heat exchanger 33. From this they pass through pipe 34 into a second heat exchanger 36. In each heat exchanger, as will be presently explained, the gases are heated by heat exchange with the gases issuing from the converters employed. The hot dry gases then pass through pipe 37 through the first converter 38 wherein at least a portion of the $SO_2$ present is caused, because of the presence of the catalyst in the converter, to react with the oxygen present and form sulphur trioxide. From the converter the gases pass through pipe 39 through the heat exchanger 36 to heat gases passing therethrough, then on through pipe 41 to the second converter 42. From this gases now free of $SO_2$ and containing sulphur only in the form of sulphur trioxide, pass through pipe 43 into the heat exchanger 33, from which they pass through pipe 44 to the absorbing tower 46 wherein the sulphur trioxide is taken up by water to form sulphuric acid.

As a specific operation illustrative of the practice of this invention the following is set forth. An alkylation sludge was employed containing 87% $H_2SO_4$, 6.5% carbon, 1% hydrogen, 3% water, and about half of 1% free oil and a considerable quantity of dissolved sulphur dioxide. I injected 8,000 pounds of the sludge per hour together with 6,700 cubic feet of refinery waste gases. Burning of the waste gases resulted in the sludge being consumed in the combustion chamber 10 at a temperature maintained between 1500° and 1800° F., sufficient air being supplied to insure the carbon present was converted to carbon dioxide, the sulphur present was all in the form of sulphur dioxide while all hydrogen present was oxidized to form water. The combustion gases formed were passed through the apparatus previously described, being reduced in temperature to 75 degrees F. as they issued from the filter 26 and having a water content of only 8 milligrams of water per cubic foot as gases passed from the drying tower 28 through pipe 29 into the conversion unit.

Since the present invention is not concerned with the details of mechanical construction, the drawing is really more in the nature of a flow sheet. It should be understood, of course, that various modifications in equipment and arrangement may be necessary to meet the particular conditions in different plants and these are included in the invention. For example, in starting up such plants auxiliary heat must be provided, because the temperature is insufficient to permit the catalytic oxidation of sulphur dioxide to commence unless the bodies of catalytic materials in the converter are brought up to temperature. A suitable starting furnace will enable this to be achieved. It is, therefore, essential but, since it forms no part of the present invention, neither it nor the various valves nor the other control mechanisms, pumps, etc., are shown, these being readily provided by those skilled in the art in view of the foregoing adequate disclosure.

In connection with the catalytic material carried by the checkerwork 17, I preferably employ materials which will promote the combustion of carbon and hydrogen to carbon dioxide and water although the extended surface of the checkerwork acts in part in this way. Such catalysts are, for example, metal salts such as a copper salt and other metals. These catalysts are well known as is the impregnation of the brick.

I claim:

1. A process for converting an alkylation sludge containing sulphuric acid and sulphur compounds to sulphur dioxide in a combustion chamber having an extensive internal surface and brick checkerwork at one end thereof through which gases issuing from the chamber must pass, said checkerwork brick carrying catalytic material promoting combustion of carbon and hydrogen with oxygen, said process comprising burning a fuel with excess air in said combustion chamber to heat said extensive surface and said brick checkerwork and to supply radiant heat to said chamber at a temperature of above 1500° F., spraying the sludge into said combustion chamber to evaporate water thereform and burn with said excess air substantially all carbon, hydrogen and sulphur compounds respectively to carbon dioxide, water, and sulphur dioxide, passing the resulting gases through said checkerwork to ensure completion of the carbon and hydrogen oxidation, cooling the gases issuing from said furnace after passage through said checkerwork to condense the major portion of water in said gases, separating said condensed water and drying the remaining gases with concentrated sulphuric acid to remove substantially all the water therefrom.

2. A process for converting sludge containing hydrocarbonaceous material, sulphuric acid and sulphur compounds to sulphur dioxide in a combustion chamber having an extensive internal surface and brick checkerwork at one end thereof through which gases issuing from the chamber must pass, said checkerwork brick carrying catalytic material promoting combustion of carbon and hydrogen with oxygen, said process comprising burning a fuel with excess air in said combustion chamber to heat said extensive surface and said brick checkerwork and to supply radiant heat to said chamber at a temperature of above 1500° F., spraying the sludge into said combustion chamber to evaporate water therefrom and burn with said excess air substantially all carbon, hydrogen and sulphur compounds respectively to carbon dioxide, water, and sulphur dioxide, passing the resulting gases through said checkerwork to ensure completion of the carbon and hydrogen oxidation, cooling the gases issuing from said furnace after passage through said checkerwork to condense the major portion of water in said gases, separating said condensed water and drying the remaining gases with concentrated sulphuric acid to remove substantially all the water therefrom.

3. A process for converting sludge containing hydrocarbonaceous material, sulphuric acid and sulphur compounds to sulphur dioxide in a combustion chamber having an extensive internal surface and brick checkerwork at one end thereof through which gases issuing from the chamber must pass, said checkerwork brick carrying catalytic material promoting combustion of carbon and hydrogen with oxygen, said process comprising burning a fuel with excess air in said combustion chamber to heat said extensive surface and said brick checkerwork and to supply radiant heat to said chamber at a temperature of above 1500° F., spraying the sludge into said combustion chamber to evaporate water therefrom and burn with said excess air substantially all carbon, hydrogen and sulphur compounds respectively to carbon dioxide, water, and sulphur dioxide and passing the resulting gases through said checkerwork to ensure completion of the carbon and hydrogen oxidation.

4. A process for converting sludge containing hydrocarbonaceous material, sulphuric acid and sulphur compounds to sulphur dioxide in a combustion chamber having an extensive internal surface and brick checkerwork at one end thereof through which gases issuing from the chamber must pass, said process comprising burning a fuel with excess air in said combustion chamber to heat said extensive surface and said brick checkerwork and to supply radiant heat to said chamber at a temperature of above 1500° F., spraying the sludge into said combustion chamber to evaporate water therefrom and burn with said excess air substantially all carbon, hydrogen and sulphur compounds respectively to carbon dioxide, water, and sulphur dioxide, passing the resulting gases through said checkerwork to ensure completion of the carbon and hydrogen oxidation, cooling the gases issuing from said furnace after passage through said checkerwork to condense the major portion of water in said gases, separating said condensed water and drying the remaining gases with concentrated sulphuric acid to remove substantially all the water therefrom.

5. A process for converting sludge containing hydrocarbonaceous material, sulphuric acid and sulphur compounds to sulphur dioxide in a combustion chamber having an extensive internal surface and brick checkerwork at one end thereof through which gases issuing from the chamber must pass, said process comprising burning a fuel with excess air in said combustion chamber to heat said extensive surface and said brick checkerwork and to supply radiant heat to said chamber at a temperature of above 1500° F., spraying the sludge into said combustion chamber to evaporate water therefrom and burn with said excess air substantially all carbon, hydrogen and sulphur compounds respectively to carbon dioxide, water, and sulphur dioxide and passing the resulting gases through said checkerwork to ensure completion of the carbon and hydrogen oxidation.

6. A process for converting an alkylation sludge containing sulphuric acid into gases containing sulphur dioxide which comprises burning gaseous fuel in the presence of excess air in a combustion chamber preceding and heating an extensive course of checkerwork in the furnace so as to maintain a temperature above 1500° F., in said chamber spraying the strong alkylation acid sludge into the flame of combustion, and then passing the resulting gases through said checkerwork, the excess of air being sufficient to burn the carbonaceous matter in said sludge but insufficient to dilute the $SO_2$ content of the gaseous products below the content suitable for use in the sulphuric acid contact process.

ALBERT C. MOHR.